(12) United States Patent
Phoha

(10) Patent No.: US 7,809,170 B2
(45) Date of Patent: Oct. 5, 2010

(54) METHOD AND APPARATUS FOR CHOOSING AND EVALUATING SAMPLE SIZE FOR BIOMETRIC TRAINING PROCESS

(75) Inventor: Vir V. Phoha, Ruston, LA (US)

(73) Assignee: Louisiana Tech University Foundation, Inc., Ruston, LA (US)

( * ) Notice: Subject to any disclaimer, the term of this patent is extended or adjusted under 35 U.S.C. 154(b) by 1091 days.

(21) Appl. No.: 11/503,427

(22) Filed: Aug. 10, 2006

(65) Prior Publication Data
US 2008/0037832 A1 Feb. 14, 2008

(51) Int. Cl.
G06K 9/00 (2006.01)
G06F 21/00 (2006.01)
G10L 17/00 (2006.01)

(52) U.S. Cl. .................. 382/115; 713/186; 340/5.8; 704/246; 902/3

(58) Field of Classification Search .............. 382/115; 713/186; 340/5.8; 704/246; 902/3
See application file for complete search history.

(56) References Cited

U.S. PATENT DOCUMENTS

| 4,685,140 A * | 8/1987 | Mount, II ................ 382/128 |
| 4,805,222 A * | 2/1989 | Young et al. ............. 382/115 |
| 5,056,141 A * | 10/1991 | Dyke .................... 340/5.27 |
| 5,208,869 A * | 5/1993 | Holt ..................... 382/138 |
| 5,491,698 A * | 2/1996 | Patel et al. .............. 714/709 |
| 5,557,686 A * | 9/1996 | Brown et al. ............. 382/115 |
| 5,617,490 A * | 4/1997 | Kume et al. .............. 382/275 |
| 5,806,030 A * | 9/1998 | Junqua .................. 704/245 |
| 6,591,224 B1 * | 7/2003 | Sullivan et al. ........... 702/179 |
| 7,167,583 B1 * | 1/2007 | Lipson et al. ............. 382/147 |
| 7,336,814 B2 * | 2/2008 | Boca et al. ............... 382/141 |
| 7,409,371 B1 * | 8/2008 | Heckerman et al. ......... 706/12 |
| 7,493,340 B2 * | 2/2009 | Rui ..................... 1/1 |
| 2002/0081033 A1 * | 6/2002 | Stentiford ............... 382/218 |
| 2002/0184019 A1 * | 12/2002 | Hartley et al. ............ 704/240 |
| 2003/0212544 A1 * | 11/2003 | Acero et al. ............. 704/9 |
| 2004/0091136 A1 * | 5/2004 | Dombrowski ............. 382/115 |
| 2004/0193019 A1 * | 9/2004 | Wei .................... 600/300 |
| 2004/0236573 A1 * | 11/2004 | Sapeluk ................. 704/224 |
| 2005/0102665 A1 * | 5/2005 | Barta et al. .............. 717/174 |
| 2005/0180547 A1 * | 8/2005 | Pascovici ............... 379/88.01 |
| 2005/0265618 A1 * | 12/2005 | Jebara .................. 382/243 |
| 2006/0018523 A1 * | 1/2006 | Saitoh et al. ............. 382/124 |
| 2006/0074656 A1 * | 4/2006 | Mathias et al. ............ 704/243 |
| 2006/0287856 A1 * | 12/2006 | He et al. ................ 704/256 |
| 2007/0174308 A1 * | 7/2007 | Rausch .................. 707/100 |
| 2007/0177773 A1 * | 8/2007 | Hu et al. ................ 382/119 |
| 2007/0180261 A1 * | 8/2007 | Akkermans et al. ........ 713/186 |
| 2007/0203707 A1 * | 8/2007 | Carus et al. .............. 704/270 |
| 2007/0217676 A1 * | 9/2007 | Grauman et al. .......... 382/170 |
| 2007/0241861 A1 * | 10/2007 | Venkatanna et al. ....... 340/5.52 |

\* cited by examiner

Primary Examiner—Bhavesh M Mehta
Assistant Examiner—Kathleen S Yuan
(74) Attorney, Agent, or Firm—Blakely Sokoloff Taylor & Zafman LLP

(57) ABSTRACT

At least two biometric measurements of a person are collected, then a statistical measure based on the measurements is computed. The statistical measure is a bounded estimate of the discriminative power of a test based on the measurements. While the discriminative power is less than a target value, additional biometric measurements are collected. When enough measurements have been collected, a biometric template is constructed from the measurements and stored for use in future identifications. Systems and software to implement similar methods are also described and claimed.

8 Claims, 3 Drawing Sheets

US 7,809,170 B2

METHOD AND APPARATUS FOR CHOOSING AND EVALUATING SAMPLE SIZE FOR BIOMETRIC TRAINING PROCESS

FIELD

The invention relates to training biometric authentication systems. More specifically, the invention relates to selecting an adequate number of training samples to achieve a desired level of authentication performance, and evaluating the level of authentication performance that may be expected from a set of training samples.

BACKGROUND

Biometric identification and authentication systems measure physical and/or behavioral characteristics of a person and compare the characteristics to an earlier-prepared sample or "template" to determine whether the measurements were taken from the same person. This determination can be used to control access to tangible or intangible assets and resources on a per-person basis. Other systems based on a physical or informational key (e.g. an actual key, an electronic identification card, or a password) cannot restrict access to a particular person, since the person can transfer the key or password to someone else.

The measurements taken by a biometric system typically vary slightly at each measurement, so the comparison process must accommodate such slight variances. The accuracy of a biometric identification is inversely proportional to the amount of variability tolerated in a set of measurements: if more variability is permitted in measurements, then it becomes easier for an impostor to fool the system. On the other hand, as the permissible variability is reduced, legitimate users are more likely to be rejected due to normal measurement variances. Two key metrics describing the performance of a biometric identification system are the false reject ratio ("FRR" or "$\alpha$," the probability of legitimate user erroneously being rejected as an impostor), and the false accept ratio ("FAR" or "$\beta$," the probability of an impostor erroneously being identified as a legitimate user). Administrators of biometric identification systems often tune the system's parameters to achieve a FAR and FRR that balance the security requirements of the resource protected by the system against the inconvenience to legitimate users of erroneous rejections.

One difficulty encountered in operating a biometric identification system is that of enrolling users into the system. Because of the previously-mentioned measurement variances, many systems require a new enrollee to provide a large number of measurement samples so the system can build a template that will permit accurate identifications later. Providing many samples can be tedious or inconvenient for the new user. Formal methods of evaluating samples to determine when "enough" have been collected, and of estimating identification performance that may be expected given a set of samples, may improve the usefulness and convenience of biometric identification systems.

BRIEF DESCRIPTION OF DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

This disclosure presents an analysis of variance-based methods to estimate the number of samples required to achieve a desired level of discriminative performance from a biometric-measurement-based identification system. Formal mathematical methods are used to explain the operation of systems and methods according to embodiments of the invention.

For concreteness, the following discussion will focus on keystroke or typing rhythm patterns as the biometric measurement source. However, it will be apparent to those of ordinary skill in the relevant arts that the methods discussed here can be applied to other biometric measurements, such as fingerprint images, hand geometry measurements, voice recordings, iris and retina patterns, and other similar data.

Figure 1:
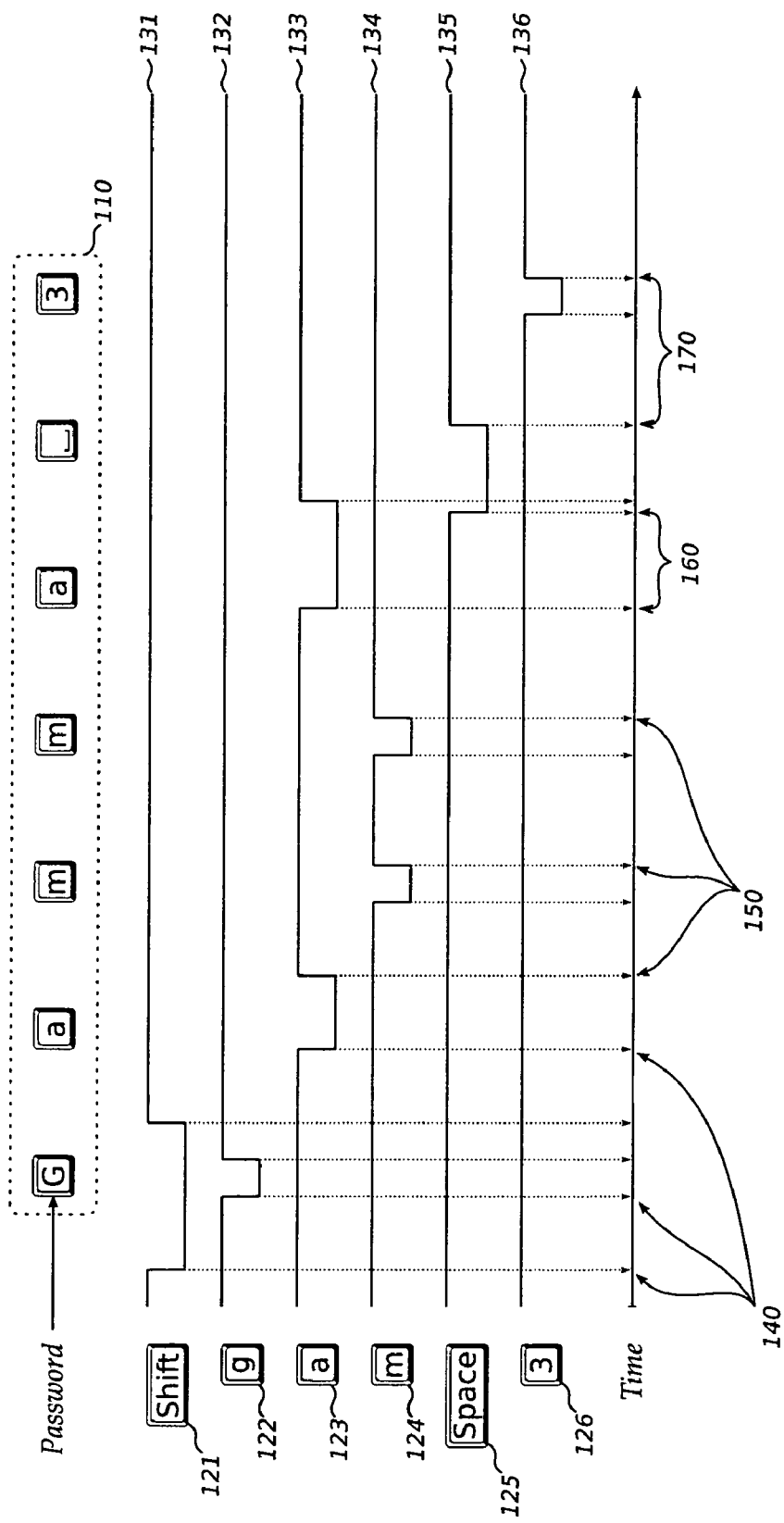
FIG. 1 illustrates one method for collecting biometric measurements of a user. The measurements can serve as input to an embodiment of the invention.

FIG. 1 shows some data that can be collected as a user types characters on a keyboard. The characters typed in the example depicted are those of password 110, "Gamma 3". Trace lines 131-136 indicate the press/release state of keyboard keys 121-126, respectively. Time measurements are taken as each key is pressed (140) and released (150). Derivative timing measurements such as the time between consecutive key presses (160) or consecutive key releases (170) may also be computed from key press and key release times and included in a biometric measurement.

Note that typing a multi-character string once results in the generation of a plurality of timing measurements. In this disclosure, a single "biometric measurement" is considered to be a plurality of scalar quantities. It is convenient to think of a biometric measurement as a vector. In accordance with common academic practice, vectors will be indicated by bold, upper-case letters (e.g. "Y"), while the scalar quantities that make up a vector are indicated by subscripted, upper-case, italic letters (e.g. "$Y_1$"). One of a plurality of biometric measurements will be indicated as a subscripted vector (e.g. "$\mathbf{Y}_2$"). One scalar quantity out of a plurality of biometric measurement vectors will be indicated as "$Y_{ij}$" (the $j^{th}$ scalar quantity of the $i^{th}$ biometric measurement vector).

Biometric measurement values are modeled as $$Y_{ij} = \mu_j + \epsilon_{ij} \qquad \text{Eq. 1}$$

where $1 \leq i \leq n$ (the number of independent biometric measurements collected) and $1 \leq j \leq m$ (the number of scalar elements in each biometric measurement). $\mu_j$ is the mean of the $j^{th}$ element, and $\epsilon_{ij}$ is an error random variable with a mean of zero. $\mu_j$ can be rewritten as $\mu + \tau_j$, where $\mu$ is a constant and $\tau_j$ represents the positive or negative deviation of the $j^{th}$ measurement from this constant. Thus, we have $$Y_{ij} = \mu + \tau_j + \epsilon_{ij} \qquad \text{Eq. 2}$$

A simplifying assumption used here is that $\epsilon_{ij}$ are mutually independent.

Further comments regarding notation: dot (e.g. "$Y_{\cdot j}$") means "add over all the values of the subscript replaced with a dot," and the bar (e.g. "$\overline{Y_{\cdot j}}$") means "divide by the number of terms that have been added up (i.e., compute the average)."

Finally, the standard deviation of a column-wise set of scalar measurements will be denoted as $\sigma_{Y_{\cdot j}}$.

The means of each measurement elements in a sequence of biometric measurement vectors may be different. For example, consider the vectors obtained by recording key press times while a user types the password "Gamma 3" several times. These times are shown in Table 1 (all in milliseconds):

TABLE 1

| Trial | Element ($1 \leq j \leq n$) | | | | | | |
|---|---|---|---|---|---|---|---|
| ($1 \leq i \leq m$) | shift | G | a | m | m | a | space | 3 |
| 1 | | 144 | 192 | 112 | 160 | 80 | 112 | 272 |
| 2 | | 144 | 160 | 112 | 144 | 80 | 96 | 224 |
| 3 | | 160 | 288 | 144 | 160 | 64 | 112 | 192 |
| 4 | | 144 | 192 | 112 | 144 | 176 | 128 | 240 |
| 5 | | 144 | 192 | 128 | 160 | 48 | 128 | 224 |
| $\overline{Y}_{\cdot j}$ | | 147.20 | 204.80 | 121.60 | 153.60 | 89.60 | 115.20 | 230.40 |
| $\sigma_{Y\cdot j}$ | | 7.16 | 48.53 | 14.31 | 8.76 | 50.09 | 13.39 | 29.07 |

The table shows that the "G" key is struck, on average, 147.20 ms after the "shift" key, and the first "a" keystroke occurs, on average, 204.80 ms after the "G." (The first column, "shift," is blank because that key is the first key struck and serves only to mark the beginning of a trial.) Elements of other vectors of biometric measurements will also, in general, have different means. However, if the measurements are transformed as:

$$Y_{ij} \leftarrow \frac{Y_{ij} - \overline{Y}_{\cdot j}}{\sigma_{Y\cdot j}} \quad \text{Eq. 3}$$

the measurements may be dealt with as random variables of zero mean and unit variance (standard normal variables). This transformation can be thought of as shifting the means of corresponding measurements to coincide at zero, and scaling the samples so that the variance of each set of corresponding samples is one. Thus transformed, the measurements can be treated more uniformly. For example, an estimate of sum of squares for errors is given by $$ssE = \sum_j \sum_i (Y_{ij} - \overline{Y}_{\cdot j})^2 \quad \text{Eq. 4}$$

and an estimate of mean square for error is given by $$msE = \frac{ssE}{m-n} \quad \text{Eq. 5}$$

Similarly, the sum of squares of measurement elements is given by $$ssL = \sum_j m(Y_{\cdot j} - \overline{Y}_{\cdot \cdot})^2 \quad \text{Eq. 6}$$

and the mean square measurement is $$msL = \frac{ssL}{n-1} \quad \text{Eq. 7}$$

With these quantities defined, we can derive the upper confidence limit for $\sigma^2$ as $$P\left(\frac{SSE}{\sigma^2} \geq \chi^2_{m-n,1-\alpha}\right) = 1 - \alpha \quad \text{Eq. 8}$$

where $\chi_{m-n,1-\alpha}^2$ is the percentile of the chi-squared distribution with probability of $1-\alpha$ in the right-hand tail, because $SSE/\sigma^2$ follows the $\chi^2$ distribution. Replacing SSE by its observed value ssE (Eq. 4) gives a one-sided $100(1-\alpha)\%$ confidence bound for $\sigma^2$:

$$\sigma^2 \leq \frac{ssE}{\chi_{m-n,1-\alpha}} \quad \text{Eq. 9}$$

This is the upper bound for the error ($\epsilon$) variance.

This result is significant because it relates an important variable describing biometric identification system performance ($\alpha$) to the samples collected while enrolling a new user. Thus, it becomes possible to answer the questions, "given the samples collected, how can the system be expected to perform?" And conversely, "are the samples that have been collected consistent enough to achieve a desired level of performance?"

It is also possible to calculate the number of (additional) biometric measurements likely to be required to achieve target values for false reject ratio ("FRR" or "$\alpha$") and false accept ratio ("FAR" or "$\beta$"), given the variance ($\sigma^2$) of the samples already collected. Let $\Pi(\Delta)=(1-\beta)$ denote the power of the F-test at $\Delta$, which is the probability of rejecting a hypothesis $H_0=\{\tau_1,\ldots,\tau_m\}$ when at least two of the elements differ by $\Delta$. Thus for given values of $\Delta, \Pi(\Delta)$, m, and $\alpha$, and variance $\sigma^2$ of the data being collected, we can calculate how many more samples are needed.

Given a hypothesis $H_0$ against $H_A:\{\text{at least two } \tau_j s \text{ differ}\}$ is given by reject $H_0$ if $$\frac{msL}{msE} > F_{m-1,n-m,\alpha}.$$

If the null hypothesis is correct then msL/msE has an F distribution, but if the null hypothesis is incorrect then msL/msE has a non-central F distribution $F_{m-1,n-m,\delta^2}$ where the noncentrality parameter $\delta^2$ is given by:

$$\delta^2 = \frac{(m-1)Q(\tau_j)}{\sigma^2} \qquad \text{Eq. 10}$$

where $$Q(\tau_j) = \sum_i r_i \left(\tau_i - \sum_b r_b \tau_b / n\right)^2 \Big/ (m-1) \qquad \text{Eq. 11}$$

Thus, when $Q(\tau_j)=0$ then $\delta^2=0$ and distribution of msL/msE becomes the usual F-distribution. If $\delta^2>0$ then the mean and the spread of the distribution of msL/msE are larger than the usual F-distribution. For equal sample sizes $$r = r_1 = r_2 = \ldots = r_m, \delta^2 = r \sum_i \frac{(\tau_i - \overline{\tau_.})^2}{\sigma^2}.$$

Now let $$\mu + \tau_2 = \mu + \tau_3 = \ldots = \mu + \tau_{m-1} = c \text{ and}$$

$$\mu + \tau_1 = c + \frac{\Delta}{2} \text{ and } \mu + \tau_m = c - \frac{\Delta}{2}$$

for some constant c, then $$\delta^2 = r \sum_i \frac{(\tau_i - \overline{\tau_.})^2}{\sigma^2} = \frac{r\Delta^2}{2\sigma^2} \qquad \text{Eq. 12}$$

The power of the F-test depends on the sample size r through the distribution of msL/msE, which depends on $\delta^2$. Since the power of the F-test is the probability of rejecting $H_0$, we have $$\Pi(\Delta) = P\left(\frac{msL}{msE} > F_{m-1,n-1,\alpha}\right) \qquad \text{Eq. 13}$$

The noncentral F can be found from standard tables of F distribution, which are tabulated with power $\Pi$ given as a function of $\Phi=\delta/m$ for various values of $v_1=m-1$ and $v_2=n-m$ and $\alpha$. Now, $$\Phi^2 = \frac{\delta^2}{m} = \frac{r\Delta^2}{2m\sigma^2}$$

(substituting the value of $\delta^2$ from Eq. 12), so $$r = \frac{2m\sigma^2 \Phi^2}{\Delta^2} \qquad \text{Eq. 14}$$

r is the result of interest: it is the estimated number of biometric samples required to enroll the user to an expected level of accuracy. Practical implications of this result include that more samples should be collected if the number of samples collected so far is less than r. Also, the form of the equation confirms the intuitive hypotheses that the higher variation $\sigma^2$ in the collected samples, the more samples will be required, and that the larger the value of $\Delta$, the fewer samples will be needed.

Listing 1 shows an pseudo-code implementation of an algorithm for finding the required sample size given the variance of the already-collected samples and other parameters:

Listing 1

```
10  int
20  NumberOfSamplesRequired(Δ, π(Δ), m, α) {
30      VarianceUpperBound = ssE / χ²;        /* From Eq. 9 */
40      v1 = m - 1;
50      v2 = 1000;                             /* Initialize v₂ to large value */
60      do {
70          Φ = LookupPhiFromTable(π(Δ), v1, v2 );
80          r = round( 2 * m * VarianceUpperBound * Φ² / Δ² ) + 1;
90          v2 = m * ( r - 1 );
100     } until (r converges or oscillates);
110     return r;
120 }
```

Figure 2:
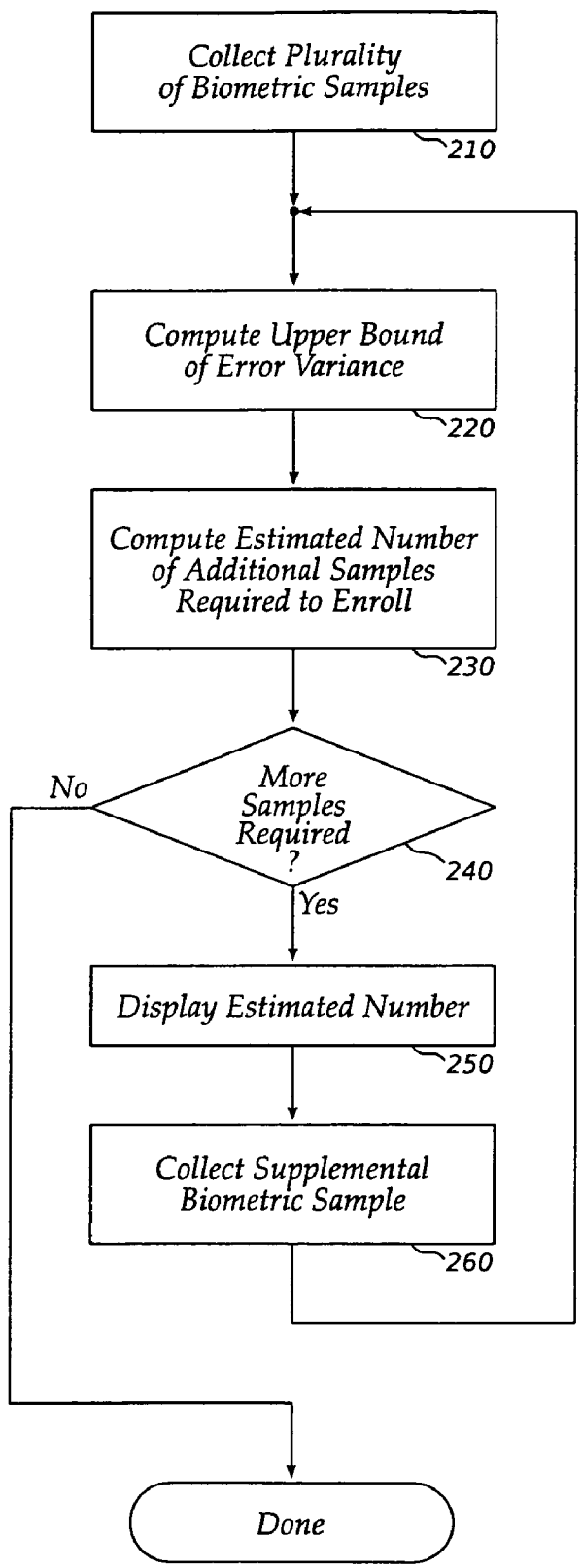
FIG. 2 is a flow chart of operations according to an embodiment of the invention.

FIG. 2 outlines a practical application of the mathematical principles derived above. First, a plurality of biometric samples is collected (210). Embodiments may collect fingerprints, hand geometry measurements, iris or retina images, or (as considered in greater detail in the examples presented here) keystroke timing measurements. Next, an upper bound for the error variance is computed (220), and an estimated number of samples needed is calculated (230). These operations correspond to the functionality of the pseudo code shown in Listing 1. If the number of samples already collected equals or exceeds the estimated number (240), enrollment is complete. Otherwise, an embodiment may display the estimated number of samples still required to the user (250) via a numeric display, a "thermometer" graph, or some similar representation. A supplemental biometric sample (of the same type) is collected (260) and the computations (220, 230) are repeated over all the collected samples. Since the estimate of samples required to complete enrollment can be re-computed after each additional sample is collected and the enrollment process can be completed after enough statistically-adequate samples are obtained, enrollment may be completed more quickly than a prior-art system that fixes a priori a required sample count and collects that number of samples before analyzing them to prepare a template.

The following paragraphs work a concrete example of an embodiment of the invention that uses keystroke latency timings (key-to-key delays as described above). The user is typing the string "phoha" to enroll. Nine samples were collected (raw data is shown in Table 2, and normalized latencies shown in Table 3) but, as the following calculations will show, only three are needed (so, using an embodiment of the invention, the sample collection could have terminated after collecting the third sample). A computation will also be shown using only the first three latencies (as if the user had only typed "phoh") to show the effect of a shorter biometric vector.

TABLE 2

| Trial | Element ($1 \leq j \leq 5$) | | | | |
|---|---|---|---|---|---|
| ($1 \leq i \leq 9$) | p | h | o | h | a |
| 1 | 375 | 171 | 172 | | 235 |
| 2 | 328 | 176 | 172 | | 265 |
| 3 | 375 | 171 | 172 | | 235 |
| 4 | 360 | 171 | 157 | | 468 |
| 5 | 359 | 190 | 172 | | 313 |
| 6 | 328 | 176 | 156 | | 281 |
| 7 | 344 | 176 | 172 | | 312 |
| 8 | 328 | 192 | 156 | | 250 |
| 9 | 328 | 171 | 156 | | 250 |

TABLE 3

Normalized Element
$$Y_{ij} \leftarrow \frac{Y_{ij} - Y_{\bullet j}}{\sigma_{Y_{\bullet j}}}$$

| Trial | p | h | o | h | a |
|---|---|---|---|---|---|
| 1 | 1.360782 | −0.72939 | 0.842701 | | −0.75172 |
| 2 | −0.94166 | −0.14193 | 0.842701 | | −0.34086 |
| 3 | 1.360782 | −0.72939 | 0.842701 | | −0.75172 |
| 4 | 0.62596 | −0.76611 | −0.96309 | | 2.439281 |
| 5 | 0.576972 | 1.54153 | 0.842701 | | 0.316513 |
| 6 | −0.94166 | −0.14193 | −1.08347 | | −0.12174 |
| 7 | −0.15785 | −0.14193 | 0.842701 | | 0.302818 |
| 8 | −0.94166 | 1.838556 | −1.08347 | | −0.54629 |
| 9 | −0.94166 | −0.72939 | −1.08347 | | −0.54629 |

Table 4 shows the results of calculating ssE as described in relation to Eq. 4. No values are shown in the upper and left cells because a minimum of two samples (each with at least two normalized latencies) are required to decide whether more samples are required.

TABLE 4

| | ssE after typing: | | | | |
|---|---|---|---|---|---|
| Trial | p | ph | pho | phoh | phoha |
| 1 | | | | | |
| 2 | | | 3.742818 | 3.477706 | 5.251550509 |
| 3 | | | 5.49517 | 5.097502 | 8.18814591 |
| 4 | | | 6.614068 | 8.107023 | 14.70847617 |
| 5 | | | 7.204777 | 8.565175 | 14.95029652 |
| 6 | | | 9.195242 | 12.81303 | 19.33470292 |
| 7 | | | 10.31425 | 15.96642 | 23.36955671 |

Table 5 gives the corresponding values for msE, which are computed as ssE/(m−n) (Eq. 5) (blank rows and columns have been omitted); and the corresponding values of Chi-squared ($\chi^2$) (from statistical tables) are given on the right.

TABLE 5

| msE for Second through Fifth Sample | | | $\chi^2$ | | |
|---|---|---|---|---|---|
| pho | phoh | phoha | | | |
| 1.871409 | 1.159235 | 1.312887627 | 0.103 | 0.352 | 0.711 |
| 1.831723 | 1.0195 | 1.16973513 | 0.711 | 1.635 | 2.733 |
| 1.653517 | 1.158146 | 1.470847617 | 1.635 | 3.325 | 5.226 |
| 1.440955 | 0.951686 | 1.150022809 | 2.733 | 5.226 | 7.962 |
| 1.53254 | 1.164821 | 1.208418933 | 3.94 | 7.261 | 10.85 |
| 1.473464 | 1.228186 | 1.229976669 | 5.226 | 9.39 | 13.85 |

Table 6 gives the upper bound for $\sigma^2$ at 95% confidence level obtained by $$\sigma^2 \leq \frac{ssE}{\chi^2_{n-m, 1-\alpha}}.$$

TABLE 6

| $\sigma^2$ | | |
|---|---|---|
| pho | phoh | phoha |
| 18.16902 | 3.293282 | 1.846536747 |
| 2.576264 | 0.623548 | 0.428004072 |
| 1.011325 | 0.348315 | 0.281448071 |
| 0.527243 | 0.182106 | 0.144438936 |
| 0.38897 | 0.160422 | 0.111375017 |
| 0.281949 | 0.130797 | 0.08880698 |

With these foundational statistics computed, we proceed to calculate an estimate of the number of samples required to enroll the user successfully. This estimate is first computed after the second sample is collected, and may be re-computed after each additional sample, until the estimate is less than or equal to the total number of samples already in hand. In these calculations, we choose $\Delta=2\sigma$ (that is, if the variation is more than the $2\sigma$ of the already-collected samples then we need to take more samples). Since the data is standardized (i.e. $\sigma=1$), $\Delta=2.0$.

The estimate is given by Equation 14, reproduced here for convenience:

$$r = \frac{2m\sigma^2 \Phi^2}{\Delta^2}$$

m is 4 because there are four latencies measured as the user types "phoha": p-to-h, h-to-o, o-to-h, and h-to-a. $\sigma^2$ is 1.846536747 (from Table 6) and $\Delta^2$ is 4 (because $\Delta$ was chosen to be 2.0).

Now, statistical tables of the power of the F-test, $\Pi(\Phi)$ are consulted to find the value for $\Phi$. Those tables require values for $v_1$, the number of degrees of freedom, which in this case is simply m−1 or 3; $\alpha$; and $v_2$. We look for the desired power of the test (its discriminative power) and read off the corresponding value for $\Phi$ at the column head. As described in the algorithm of Listing 1, we begin with a large value for $v_2$ and successively approximate r by setting $v_2$ for the next iteration to m($r_{previous}$−1) until r converges to a stable value or oscillates between two values (in the latter case, we select the smaller of the two values). Table 7 shows the power of the F-test for $v_1=3$ and $\alpha=0.01$:

TABLE 7

| $v_2$ | \multicolumn{10}{c}{$\Phi$} |
|---|---|---|---|---|---|---|---|---|---|---|
|  | 1.67 | 2.00 | 2.33 | 2.67 | 3.00 | 3.33 | 3.67 | 4.00 | 4.33 | 4.67 | 5.00 |
| 5 | 0.16 | 0.25 | 0.36 | 0.48 | 0.60 | 0.71 | 0.80 | 0.87 | 0.92 | 0.95 | 0.98 |
| 6 | 0.20 | 0.31 | 0.44 | 0.58 | 0.71 | 0.81 | 0.89 | 0.94 | 0.97 | 0.99 | 0.99 |
| 7 | 0.23 | 0.36 | 0.52 | 0.66 | 0.79 | 0.88 | 0.94 | 0.97 | 0.99 | 1.00 | 1.00 |
| 8 | 0.26 | 0.41 | 0.57 | 0.72 | 0.84 | 0.92 | 0.96 | 0.99 | 1.00 | 1.00 | 1.00 |
| 9 | 0.29 | 0.45 | 0.62 | 0.77 | 0.88 | 0.95 | 0.98 | 0.99 | 1.00 | 1.00 | 1.00 |
| 10 | 0.31 | 0.48 | 0.66 | 0.81 | 0.91 | 0.96 | 0.99 | 1.00 | 1.00 | 1.00 | 1.00 |
| 12 | 0.35 | 0.54 | 0.72 | 0.86 | 0.94 | 0.98 | 0.99 | 1.00 | 1.00 | 1.00 | 1.00 |
| 15 | 0.39 | 0.59 | 0.77 | 0.90 | 0.96 | 0.99 | 1.00 | 1.00 | 1.00 | 1.00 | 1.00 |
| 20 | 0.44 | 0.65 | 0.83 | 0.93 | 0.98 | 1.00 | 1.00 | 1.00 | 1.00 | 1.00 | 1.00 |
| 30 | 0.49 | 0.71 | 0.87 | 0.96 | 0.99 | 1.00 | 1.00 | 1.00 | 1.00 | 1.00 | 1.00 |
| 60 | 0.55 | 0.77 | 0.91 | 0.97 | 0.99 | 1.00 | 1.00 | 1.00 | 1.00 | 1.00 | 1.00 |
| 1000 | 0.60 | 0.82 | 0.94 | 0.99 | 1.00 | 1.00 | 1.00 | 1.00 | 1.00 | 1.00 | 1.00 |

For the first iteration, we calculate $$r = \frac{2m\sigma^2\Phi^2}{\Delta^2}$$

$$= \frac{2 \times 4 \times 1.85}{4}\Phi^2$$

$$= 3.7\Phi^2$$

Then, looking up the value for $\Phi$ that corresponds to our initial choice of $v_2=1000$, power of the test=0.99 (highlighted triple border), we find $\Phi=2.67$ (bold). Substituting, we obtain $$r = 3.7 \times (2.67)^2$$

$$= 26.38$$

or, rounding to the nearest integer larger (because it is not possible to take a fraction of a biometric sample), 27.

For the next iteration, we set $$v_2 = m(r-1)$$

$$= 4(26)$$

$$= 104$$

then, interpolating from the values in Table 7 since there is no row for $v_2=104$, we might estimate a value for $\Phi$ of 2.95. This gives a second iteration result of r=32.20, and $v_2$ of 132. Estimating $\Phi=2.98$ gives r=32.85, and $v_2$ of 132. Since r has converged at 33, we estimate that—based on the two samples collected—a total of 33 samples will be required.

After collecting the next sample, however, we find that the variance $\sigma^2$ is 0.428004072 (Table 6). By repeating the iterative algorithm of Listing 1, we find that our estimate of samples required has dropped significantly, to only eight. The values of $v_2$, $\Phi$ and r that occur during the processing of the third sample are shown in Table 8:

TABLE 8

| Iteration | $v_2$ | $\Phi$ | r | Notes |
|---|---|---|---|---|
| 1 | 1000 | 2.67 | 6.10 | |
| 2 | 24 | 3.10 | 8.22 | |
| 3 | 32 | 3.00 | 7.70 | |
| 4 | 28 | 3.00 | 7.70 | |
| 5 | 28 | 3.00 | 7.70 | r has converged at 7.70 (rounded to 8) |

As the sample collection progresses, $\sigma^2$ keeps shrinking because the typist is quite consistent, and after the fifth sample is obtained, the method indicates that "enough" samples have been collected. Table 9 shows the iterations performed for the fourth and fifth samples:

TABLE 9

| Sample | $\sigma^2$ | Iteration | $v_2$ | $\Phi$ | r |
|---|---|---|---|---|---|
| 4 | 0.281448071 | 1 | 1000 | 2.67 | 4.01 |
|  |  | 2 | 16 | 3.33 | 6.24 |
|  |  | 3 | 24 | 3.10 | 5.41 |
|  |  | 4 | 20 | 3.17 | 5.66 |
|  |  | 5 | 20 | 3.17 | 5.66 |
| 5 | 0.144438936 | 1 | 1000 | 2.67 | 2.06 |
|  |  | 2 | 8 | 4.00 | 4.62 |
|  |  | 3 | 16 | 3.33 | 3.20 |
|  |  | 4 | 12 | 3.67 | 3.89 |
|  |  | 5 | 12 | 3.67 | 3.89 |

Repeating these calculations for the $\sigma^2$ values in the second column of Table 6 (i.e. the values that apply if the shorter string "phoh" was being typed, m=3, $v_1=2$) we see that the estimates of samples required goes from 47 to 11 to 6 to 5, and the method indicates that "enough" samples have been collected after the fifth sample. Table 10, which follows the layout of Table 9, shows how the estimated number of samples required changes after each sample is collected. Note that the value for $\Phi$ must be looked up in a different table (i.e. not Table 7) because m and $v_1$ are different in this example. The corresponding table for the power of the F-test for $v_1=2$, $\alpha=0.01$ is not reproduced here, but may be found in many statistics reference books.

TABLE 10

| Sample | $\sigma^2$ | Iteration | $v_2$ | $\Phi$ | r |
|---|---|---|---|---|---|
| 2 | 3.293282 | 1 | 1000 | 3.00 | 44.46 |
|   |   | 2 | 132 | 3.10 | 47.47 |
|   |   | 3 | 141 | 3.05 | 45.95 |
|   |   | 4 | 135 | 3.07 | 46.56 |
|   |   | 5 | 138 | 3.08 | 46.86 |
|   |   | 6 | 138 | 3.08 | 46.86 |
| 3 | 0.623548 | 1 | 1000 | 3.00 | 8.41 |
|   |   | 2 | 24 | 3.25 | 9.88 |
|   |   | 3 | 27 | 3.31 | 10.25 |
|   |   | 4 | 30 | 3.33 | 10.37 |
|   |   | 5 | 30 | 3.33 | 10.37 |
| 4 | 0.348315 | 1 | 1000 | 3.00 | 4.70 |
|   |   | 2 | 12 | 3.67 | 7.04 |
|   |   | 3 | 21 | 3.33 | 5.79 |
|   |   | 4 | 15 | 3.67 | 7.04 |
|   |   | 5 | 21 | 3.33 | 5.79 |
| 5 | 0.182106 | 1 | 1000 | 3.00 | 2.46 |
|   |   | 2 | 6 | 5.00 | 6.83 |
|   |   | 3 | 18 | 3.34 | 3.05 |
|   |   | 4 | 9 | 4.00 | 4.37 |
|   |   | 5 | 12 | 3.67 | 3.68 |
|   |   | 6 | 9 | 4.00 | 4.37 |

Note that in processing the fourth and fifth samples above, the iterative algorithm began oscillating between two values. The smaller of the two was selected in each case. Thus, after the fourth sample, 5.79 samples (rounded to six samples) were estimated to be required, while after the fifth sample, only 4.37 (5) samples were estimated to be required. Since five samples had already been collected, the enrollment process could have stopped.

This method uses the variability in a user's keystroke patterns with desired FAR and FRR to arrive at sampling decisions. In an experiment with 43 users, this method resulted in sample size of six for 75% of the users and sample sizes varying from three to nine for rest of the users. In this user population, a prior-art system would require at least nine samples from each user to be certain of successfully enrolling every user. However, by evaluating samples collected on the fly according to an embodiment of this invention, the majority of users could have enrolled with fewer samples.

The methods described above relate the number of biometric samples needed to achieve desired FRR and FAR ratios with the length of the number of characters needed in a password for keystroke authentication system. An algorithm based on this method can give an indication to give a user feedback on when he may stop giving biometric samples for authentication.

Figure 3:
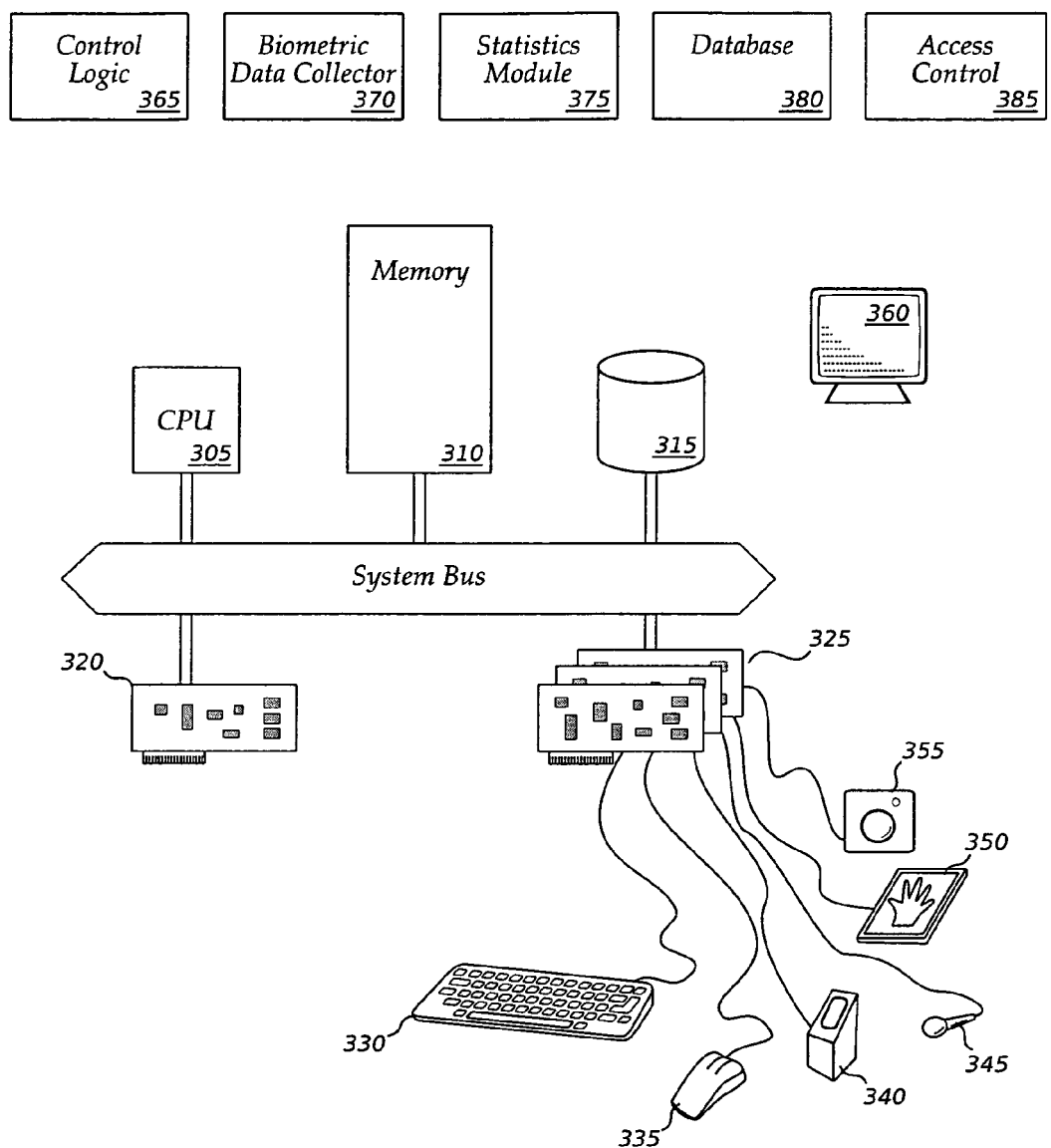
FIG. 3 shows a data processing system including physical and logical elements that implement an embodiment of the invention.

An embodiment of the invention can be implemented on a data processing system like the one shown in block-diagram form in FIG. 3. This system includes a programmable processor (a "central processing unit" or "CPU") 305, memory 310, and mass storage device 315. A network interface 320 permits the system to communicate with other systems over a distributed data network. Other interfaces 325 (which may be built into the system or added as plug-in cards, as shown here) permit the system to communicate with various peripherals to collect biometric data. This system has an extensive complement of peripherals: a keyboard 330, mouse 335, fingerprint scanner 340, microphone 345, hand geometry sensor 350 and camera 355. Of course, systems with only one or two peripherals can also implement an embodiment of the invention.

A display 360 may be provided to present instructions, messages and other information to a user (not shown). Software instructions stored in memory 310 and executed by CPU 305, dedicated hardware circuitry, or a combination of hardware and software may be used to implement functions such as control logic 365 to coordinate the activities of other subsystems and peripherals; biometric data collector 370 to operate a peripheral and take biometric measurements; statistics module 375 to analyze the collected biometric measurements according to the methods described earlier; and database 380 to store biometric templates constructed after user enrollment. Once a user has been enrolled, access control logic 385 may compare biometric data collected from a prospective user and compare it with a template stored in database 380 to decide whether the prospective user should be granted access to a resource controlled by the system (not shown).

An embodiment of the invention may be a machine-readable medium having stored thereon instructions which cause a programmable processor to perform operations as described above. In other embodiments, the operations might be performed by specific hardware components that contain hard-wired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and Erasable Programmable Read-Only Memory (EPROM).

The applications of the present invention have been described largely by reference to specific examples and in terms of particular allocations of functionality to certain hardware and/or software components. However, those of skill in the art will recognize that evaluation of biometric samples for their discriminative power can also be achieved by software and hardware that distribute the functions of embodiments of this invention differently than herein described. Such variations and implementations are understood to be captured according to the following claims.

I claim:

1. A method comprising:
   collecting a plurality of biometric measurements of a person;
   computing a statistical measure based on the plurality of biometric measurements;
   while the statistical measure is less than a target value, collecting a supplemental biometric measurement of the person and updating the statistical measure based on the supplemental biometric measurement; and
   storing a biometric template constructed from the plurality of biometric measurements and any supplemental biometric measurements, wherein the statistical measure is proportional to "m" a number of elements in one biometric measurement, is proportional to "$\sigma^2$" an upper bound for an error variance, and is inversely proportional to "$\Delta^2$" a maximum allowable difference.

2. The method of claim 1, wherein the statistical measure is proportional to $$\frac{2m\sigma^2\Phi^2}{\Delta^2},$$

where
m is a number of elements in one biometric measurement,
$\sigma^2$ is an upper bound for an error variance,
$\Phi^2$ is a power of an F test, and
$\Delta^2$ is a maximum allowable difference.

3. The method of claim 1, further comprising:
computing an estimate of a discriminative power of a biometric identification system based on the plurality of biometric measurements and any supplemental biometric measurements; and
displaying the estimate of the discriminative power.

4. The method of claim 1, further comprising:
computing an estimate of a number of supplemental biometric measurements required to complete enrollment; and
displaying the estimate to the person.

5. The method of claim 1, further comprising:
collecting a candidate biometric measurement of a candidate;
comparing the candidate biometric measurement to the biometric template; and
granting access to a resource to the candidate if the candidate biometric measurement matches the biometric template.

6. The method of claim 1 wherein each biometric measurement comprises a plurality of keystroke timing measurements collected while the person types on a keyboard.

7. A non-transitory computer-readable medium containing instructions to cause a programmable processor to perform operations comprising:
collecting a plurality of biometric measurements of a person;
computing a statistical measure based on the plurality of biometric measurements;
while the statistical measure is less than a target value, collecting a supplemental biometric measurement of the person and updating the statistical measure based on the supplemental biometric measurement; and
storing a biometric template constructed from the plurality of biometric measurements and any supplemental biometric measurements, wherein the statistical measure is proportional to "m" a number of elements in one biometric measurement, is proportional to "$\sigma^2$" an upper bound for an error variance, and is inversely proportional to "$\Delta^2$" a maximum allowable difference.

8. A system comprising:
an input device to measure a characteristic of an enrolling user;
biometric sample collection logic to collect a plurality of biometric measurements of a person from the input device;
statistical analysis logic to compute a statistical measure based on the plurality of biometric measurements, and while the statistical measure is less than a target value, collect a supplemental biometric measurement of the person and updating the statistical measure based on the supplemental biometric measurement, wherein the statistical measure is proportional to "m" a number of elements in one biometric measurement, is proportional to "$\sigma^2$" an upper bound for an error variance, and is inversely proportional to "$\Delta^2$" a maximum allowable difference; and a database to store a biometric template constructed from the plurality of biometric measurements and any supplemental biometric measurements.

* * * * *